US005375018A

United States Patent [19]

Klausner et al.

[11] Patent Number: 5,375,018

[45] Date of Patent: Dec. 20, 1994

[54] LOCATION ACQUISITION AND TIME ADJUSTING SYSTEM

[75] Inventors: Judah Klausner, Sagaponack, N.Y.; Robert Hotto, La Jolla, Calif.

[73] Assignee: Klausner Patent Technologies, Sagaponack, N.Y.

[21] Appl. No.: 731,770

[22] Filed: Jul. 17, 1991

Related U.S. Application Data

[63] Continuation-in-part of Ser. No. 555,268, Jul. 18, 1990, Pat. No. 5,068,838.

[51] Int. Cl.[5] .......... G04C 11/02; H04B 7/185

[52] U.S. Cl. .......... 368/47; 455/51.1

[58] Field of Search .......... 365/46, 47, 51, 59; 375/107; 455/12, 51.1, 51.2

[56] References Cited

U.S. PATENT DOCUMENTS

| | | | |
|---|---|---|---|
| 4,117,661 | 10/1978 | Bryant, Jr. | 365/47 |
| 4,234,958 | 11/1987 | Pides | 375/107 |
| 4,287,597 | 9/1981 | Patnter et al. | 455/12 |
| 4,501,502 | 2/1985 | Van Orsdel | 368/47 |
| 4,582,434 | 4/1986 | Plangler et al. | 365/46 |
| 4,644,347 | 2/1987 | Lucas et al. | 340/825.04 |
| 4,650,344 | 3/1987 | Allgaier et al. | 368/47 |
| 4,823,328 | 7/1989 | Conkun et al. | 368/47 |
| 5,016,231 | 5/1991 | Kawaguchi et al. | 368/80 |
| 5,068,838 | 11/1991 | Klausner et al. | 368/47 |
| 5,089,814 | 2/1992 | DeLuca et al. | 340/825.49 |

*Primary Examiner*—Vit W. Miska
*Attorney, Agent, or Firm*—Darby & Darby

[57] ABSTRACT

An information retrieval system and method for determining the location of a traveller based upon a comparison between broadcast radiowave frequencies at the location and a table of locations for radio stations which broadcast at those radiowave frequencies. By determining the location, the offset hour for the time zone where the radio station is located may be obtained for correctly displaying the hour on an analog watch. When the watch is moved to a different time zone, the hands are accelerated, forward or backward, until they indicate the local time. The location, such as a city, can also be displayed so that the traveller is apprised of both the correct time and present location automatically.

11 Claims, 4 Drawing Sheets

LOCATION ACQUISITION AND TIME ADJUSTING SYSTEM

This application is a continuation-in-part of U.S. Ser. No. 555,268 filed Jul. 18, 1990 pending U.S. Pat. No. 5,068,838

BACKGROUND OF THE INVENTION

The present invention relates generally to a system which informs a traveller of the correct local time and city location based on an analysis of radiowave frequencies.

In order to keep abreast of the correct time, travellers who cross time zones in their travels must manually reset the time displayed on their timepieces in accordance with the time zone they have reached. This is an inconvenience not only because the traveller must remember to reset the timepiece but also because the correct time in the new time zone may not be evident to the traveller. Failing to have the correct local time may lead to missed appointments, missed transit connections, etc. Even in cases where travellers travel in the same time zone, they may mistakenly believe they crossed a time zone and incorrectly reset their timepieces.

The broadcast radiowave frequencies from radio stations at known city locations are published, e.g., in the World Radio TV Handbook by BillBoard A.G. A traveller who leaves the vicinity of a first city to enter the vicinity of a second city, will then be within the broadcast range of radio stations in that second city and possibly no longer within the broadcast range of radio stations in the first city. Even if the cities are close, so that radiowave frequencies from the first city are still received, they will be weaker than those from the second city.

It would therefore be desirable to devise an entirely passive system which by using the foregoing characteristics automatically informs a traveller of the correct time in a given time zone and of the city at which the traveller has arrived and additional local information.

SUMMARY OF THE INVENTION

The present invention is directed to a system for obtaining information usable for determining the geographical location of a traveller and the local time at that location. The system includes a radiowave frequency receiver, a detector of the presence or absence of specific radiowave frequencies from the receiver, memory storage containing local time and location information for an entire range of radiowave frequencies, a microcontroller for retrieving the time and location information in the memory storage which corresponds to the detected radiowave frequency, and a display for displaying the time and location information.

Preferably, the time is reset in a timepiece in accordance with the retrieved time information by the microcontroller. Also, additional information may be supplied to the traveller based upon the retrieved location information, such as information previously stored by the user, e.g., local phone numbers and addresses at that location or reminder messages as well as information stored at the time of manufacture, e.g., local maps, points of interest, etc.

For a better understanding of the present invention, reference is made to the following description and accompanying drawings, while the scope of the invention is set forth in the appended claims.

DESCRIPTION OF THE PREFERRED EMBODIMENT

Different locations have their own "fingerprint" or signature list of radiowave frequencies transmitted by local radio stations. Such a signature list is distinct from any other location. That is, each city or location has radio stations which together transmit at a group of radiowave frequencies specific to that location. As used herein, the phrase "radiowave frequencies" includes any form of radiowave, e.g. AM, FM, VHF, UHF, etc., and the phrase "radio stations" refers to any type of transmitting location of such radio frequencies, including AM, FM, VHF, UHF, etc.

Figure 1:
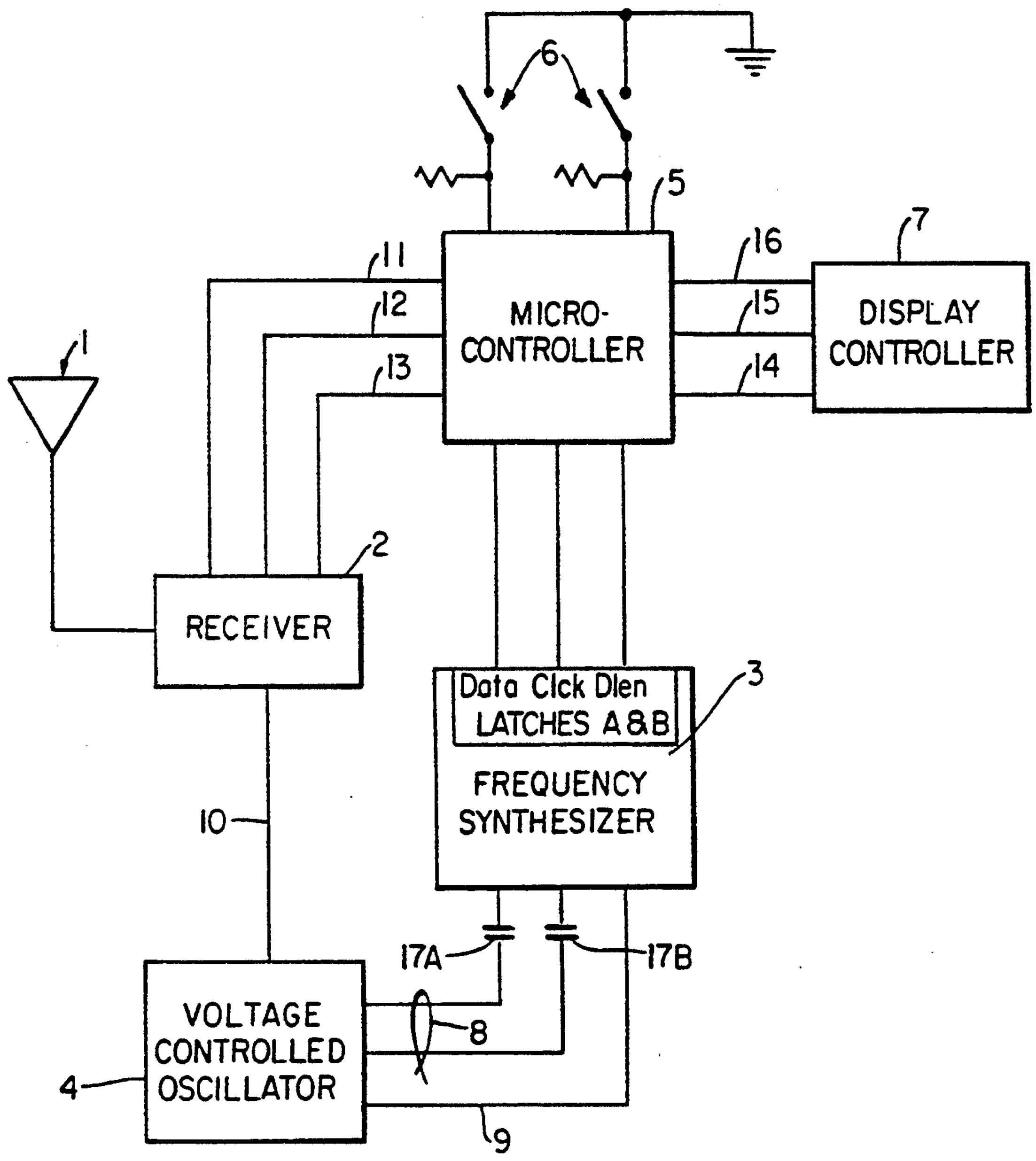
FIG. 1 is a schematic flow diagram of the location acquisition and time adjusting system in accordance with the present invention.

Turning to FIG. 1, an antenna 1 picks up all broadcast radio frequencies from local transmitting stations which are then sent to a receiver 2, as exemplified by a Signetics TEA5570. The antenna 1 may be made from copper strips in a wristwatch band, as discussed in an article entitled "Human Arm May Act as Antenna", NASA Tech Briefs, Summer 1978, pg. 179.

A microcontroller 5, exemplified by Motorola Semiconductor microcomputer MC68HCllA8, transmits bit data, which is indicative of a target radiowave frequency, to latches of A and B of a frequency synthesizer 3. Examples of suitable frequency synthesizers 3 are the Signetics SAA1057 for AM and FM tuning and the Plessey solid state SP5000 for TV tuning.

After receipt, the frequency synthesizer 3 converts the bit data into an analog voltage signal and transmits the same via line 9 to a voltage controlled oscillator 4, which may be an RC 4151 or RC 4152 voltage to frequency converter which are manufactured by Raytheon Company of Mountain View, Calif. In response to receipt of the analog voltage signal, the voltage controlled oscillator 4 then transmits a directly proportional frequency output signal to the receiver 2 via line 10.

In order to compensate for variations in temperature or battery voltage which may arise with respect to the analog voltage signal, provision is made to feed back the frequency output signal from the voltage controlled oscillator 4 to the frequency synthesizer 3 via feedback lines 8. The feedback lines 8 are capacitively coupled to the frequency synthesizer 3 and each provides different attenuations for the frequency output signal as is required by the chip manufacturer of the frequency synthesizer 3. For instance, one feedback line may handle an AM feedback signal, for which a blocking capacitor 17A would be 1 nanofahrad and the impedance of the line would be 2K ohms. The other feedback line may handle an FM feedback signal, for which a blocking capacitor 17B would be 11 nanofahrads and the impedance of the line would be 75 ohms. The receiver 2 demodulates the received radio frequencies from the antenna 1 in accordance with a frequency range selection control signal received from the microcontroller 5 via line 11 and tunes to a particular frequency in response to the proportional frequency output signal from the voltage controlled oscillator 4. A voltage signal indicative of the signal strength of the tuned frequency is transmitted by the receiver 2 to the microcontroller 5 via one line 13 and the actual audio signal is transmitted on another line 12.

The microcontroller 5 compares the signal strength of the voltage signal (for the tuned frequency) to a predetermined minimum voltage level that is above noise, i.e., a voltage level of 2 millivolts. If the comparison reveals that the signal strength is below this minimum level, then the broadcast frequency is either too weak (and thereby too distant) or was not picked up at that location. If the comparison reveals that the signal strength is above this minimum level, then there is a match between the picked up broadcast radio signal and the target radiowave frequency. Thus, presence or absence of a broadcast transmission for a frequency becomes known.

The microcontroller 5 also has read only memory (ROM), in which is stored information indicative of a signature list of radiowave frequencies corresponding to the frequencies which are broadcast at various locations in the world where radio stations are located. It should be understood that not all locations of the world need be stored; to conserve memory space, it is preferred that only signature lists from major metropolitan locations of the world be stored and/or supplemented by storage of signature lists from the region where the system is to be sold. In this manner, likely travel destinations are covered by the system.

It is also contemplated by the present invention that none of the signature lists are stored initially. In this case, the microcontroller would include an electrically alterable EEPROM. As the watch is taken to various locations, the signature list of broadcast radio frequencies for each location can be stored. Other information corresponding to the set, such as the location name, can be entered by the user, as discussed with respect to the editing mode described below.

Also stored in correspondence with each location is information indicative of the offset hour from 0 to 24 with respect to the Greenwich Mean Time that represents the time zone in which the stored location is found. Alternatively, an algorithm may be used which correlates the city with the offset hour, i.e., with respect to specific times or modified for that location on the date with respect to daylight savings time.

If the target radiowave frequency is detected in this manner as being present from the comparison check of signal strength, the microcontroller 5 stores the information indicative of the target radiowave frequency into temporary memory or random access memory (RAM). The target radiowave frequency is then incremented and the process is repeated for the entire AM and FM bands, as well as for TV bands or other transmitted bands for better accuracy. Thus, a signature list of radiowave frequencies which were matched is now stored in RAM. If desired, this signature list of matched frequencies may be arranged in a particular order, such as in order of increasing level of signal strength.

An algorithm is used to compare this signature list of matched radiowave frequencies in RAM with the signature list of prestored radiowave frequencies in ROM. When a match is found, the corresponding city stored in ROM which is associated with the matched signature list is retrieved, as well as the corresponding offset hour for that city. In the rare chance that multiple matches of signature lists are found, an algorithm may be used to determine the most likely match by choosing the match which contains broadcast radiowave frequencies with the strongest signal strengths that were picked up. Thus, aberrational radiowave frequencies (e.g., due to AM frequencies reflecting off the atmosphere from remote cities) do not pose a problem.

Additional information regarding that city may also be stored, e.g., prestored at the factory or stored by the user. Such information may include local phone numbers and addresses, reminder messages, maps, travel tips, etc. This information may then be retrieved any time after the common city has been identified.

Figure 2:
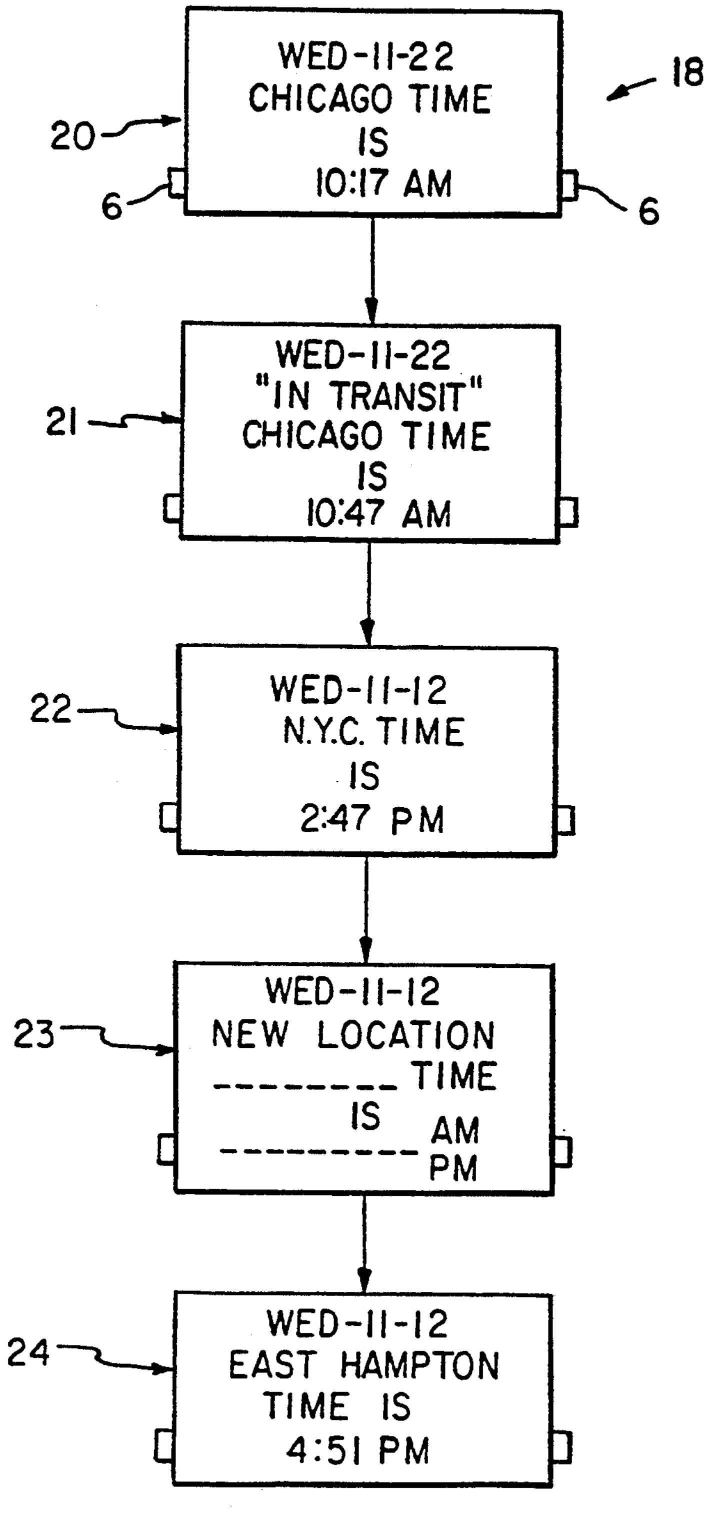
FIG. 2 is a schematic showing the top view of a display in accordance with the invention as it is moved between locations.

Either or both the local city and time, offset by the offset hour, may be displayed by a liquid crystal display (LCD) 18 as shown in FIG. 2. The LCD is driven by a display controller 7, which receives information regarding the common city and offset hour from the microcontroller 5. A suitable display controller 7 for a LCD display is exemplified by OKI semiconductor MSM6255GS dot matrix LCD controller, which uses a 5-volt power supply. The microprocessor 5 transmits data (e.g., a character storing indicative of the city) via a data line 15 to the display controller 7 and transmits clock information via a clock line 16 to the display controller. In order to conserve memory space in the microcontroller 5, data information may be stored in the display controller 7 and may be accessed and transmitted by the microcontroller 5 via another data line 14.

Timekeeping is done by clock circuitry in the microcontroller 5, which processes realtime and the calendar date using well known calendar/clock algorithms. Information regarding the present time is transmitted to the display controller for displaying the time. In the preferred embodiment, the realtime computation is Greenwich Mean Time. Leap year is also kept track of for adjustment of the time and calendar date.

The microcontroller 5 offsets the computed realtime hour by the offset hour and sends the result to the display controller 7 as the correct hour to be displayed adjacent to the minutes. The calendar date computed by the microcontroller 5 may be displayed as well.

As an alternative, the setting of the hour in the microcontroller 5 may be adjusted with respect to the hour based on the offset hour. In such a case, the microcontroller 5 would also keep track of the previously stored offset hour and use the difference between the offsets for updating the hour.

The counter/timer interrupt system is responsible for the incrementing of time and is responsive to a clocked interval derived from an 8 Megahertz crystal that drives the microcontroller 5. An on-board counter/timer system normally takes care of the actual timing of the real-time clock. The realtime clock is described by pages 62 and 63 of a 1986 "100 SQUARED" system documentation manual by New Micros Inc. of Grand Prairie, Tx.

A software and firmware algorithm is provided for precision time incrementation and is composed of an initiation routine, an interrupt handler routine and a time/calendar adjusting routine. The initiation routine sets up the bit pattern that is loaded into timer control registers and timer interrupt registers for establishing a period interrupt that is the basis of the lowest time interval. The interrupt handler routine responds to a generated interrupt arising from overflow in the on-board counter/timer system and increments stored time. The time/calendar adjusting routine adjusts the time/date based on the city the user is in and the date and year.

A power supply system, such as a 5 volt battery, is used to provide power for the entire circuitry, e.g., connected to the microcontroller 5. The power supply system is preferably capable of being fitted into a small clock or watch and is lithium Nicad or silver type.

The microcontroller 5 controls scanning of all the radiowave frequencies incrementally at preset intervals, e.g., once every 30 or 60 minutes. This is accomplished by the microcontroller 5 serially clocking data into two fifteen bit data latch registers A, B, which tune the radio frequency synthesizer 3 to a specific target frequency in the AM or FM mode. The word in latch register A determines the target radiowave frequency and the word in latch register B determines the control information such as AM or FM frequency range of the target radiowave frequency.

The target radiowave frequency is incremented, preferably as permitted by the SAA1057 for AM at 512 Kilohertz to 32 Megahertz in 1 or 1.25 Kilohertz steps and for FM at 70 Megahertz to 120 Megahertz in 10 or 12.5 Kilohertz steps. For some areas, these ranges may exceed the licensed ranges. For the SP5000, frequencies up to 1024 Megahertz in 62.5 Kilohertz steps are available. The increment preferably may be supplied to the frequency synthesizer 3 as control information from the microcontroller 5, although the frequency synthesizer 3 may have provision to increment automatically based on receipt of the control information regarding frequency range from the microcontroller 5.

The counter/timer interrupt system is responsible for the incrementing of time and is responsive to a clocked interval derived from an 8 Megahertz crystal that drives the microcontroller 5. An on-board counter/timer system normally takes care of the actual timing of the real-time clock. The real-time clock is described by pages 62 and 63 of a 1986 "100 SQUARED" system documentation manual by New Micros Inc. of Grand Prairie, Tx.

As soon as a battery is in place for powering the system, the time is displayed and updated each second by the microcontroller 5, which responds to an interrupt generated by the counter/time each second (or each 100th of a second if so programmed). The microcontroller 5 polls the switches 6; not pressing a switch indicates a logic high state and pressing a switch indicates a logic low state. Software debouncing, i.e., compensating the circuitry for vibrations arising from pressing the switches, is accomplished by means of polling the switches 6 for longer than 10 ms. The interrupt handler software routine performs the timing function as a background task; the microcontroller 5 initiates radiowave frequency signal list acquisition every 30 or 60 minutes (or any other desired interval) and handles user interface as foreground tasks.

The system may have a normal operation mode during normal operation and an editing mode for enabling the user to store information. One of the switches or a predetermined combination of switches may be pressed to alternate between the normal operation mode and the editing mode.

In the normal operation mode, information may only be displayed, not changed. For instance, pressing a pushbutton 6 may initiate the microcontroller 5 to cycle displays of time, location, stored reminder information, etc. Pressing the other pushbutton 6 will cause the mode to change into an editing mode.

In the editing mode, information may be changed. For instance, the system may enable entry of location information when brought into any area which it can not recognize. When the system picks up a set of broadcast radio frequencies with the greatest signal strength for the area but is unable to find a match, the words "NEW LOCATION" may blink on the display and the system may automatically enter the edit mode. The pushbuttons 6 are pressed to enable data entry of any alphanumeric characters (0–9, A–Z) to permit a user to spell out the location. Once spelled out, the location is then stored in electrically alterable EEPROM together with this set of broadcast radio frequencies for future matching. The system then returns to normal mode.

The editing mode is also employed to enable a user to enter information specific to a recognized or newly recognized location, e.g., names, phone numbers, addresses, etc. Again, alphanumeric characters may be selected and entered by a user to spell out the information to be stored in connection with the location recognized by the system.

The pushbuttons 6 may facilitate data entry in any one of a number of different possibilities, i.e., for changing the system between normal and editing modes, for switching between different categories of information (e.g., names, phone numbers, addresses, locations, calendar day, etc.), for initiating incrementation of alphanumeric characters, and for stopping the incrementation and causing the displayed alphanumeric character to be stored. Also, an entire keyboard of pushbuttons may be provided, each pushbutton representing a different alphanumeric character, and different function keys.

It is also possible for the system of the present invention to be used with analog watches having hands to display the time. In this case, it is necessary to move the hands forward or backward as the watch is moved from time zone to time zone.

The preferred time keeping algorithm would be as described above, where the hour is adjusted based on the previous offset hour. This would minimize the amount of hand movement required to keep the hands set to the local time.

Figure 6:
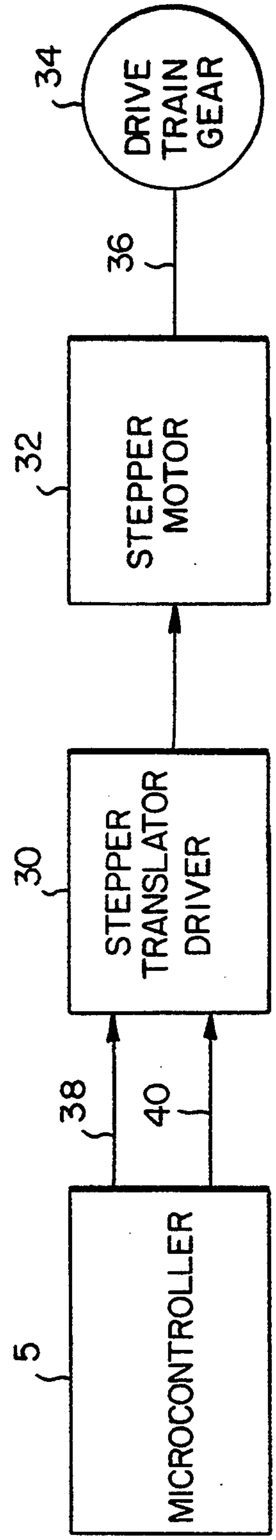
FIG. 6 is a schematic diagram of another embodiment of the present invention directed to an analog timepiece.

With the preferred analog watch of the present invention, as illustrated in FIG. 6, the microcontroller 5 is shown connected to stepper translator/driver 30 which provides the drive power and sequence to cause a stepper motor 32 to increment. The stepper motor 32 is attached to a shaft 36 connected to a drive train gear 34, which in turn is connected to the hands.

In the preferred watch, normal time keeping is maintained by the microcontroller 5 with six square wave pulses per second on line 40 to the stepper translator/driver 30. A direction output line 42 is normally kept in a high logic state to maintain forward motion of the hands. When it is necessary to drive the hands at a higher speed than normal, for example, when the watch is moved to a different time zone, the microcontroller 5 increases the pulse frequency applied to the motor 32 as described in detail below.

For example, to advance the hands one hour requires 21,600 steps of the motor 32 in the preferred analog watch (where six steps equal one second). Within the microcontroller 5, the six pulses per second is preferably maintained by using a delay loop that is executed between each pulse. Initially, the delay loop is set at one-sixth of a second. To increase the speed of the stepper motor and the hands, the delay loop is preferably decremented after each of a series of pulses until the pulse rate and stepper motor speed are at a predetermined maximum. The delay loop can be decremented by a constant amount to cause linear acceleration or preferably by an increasing amount to cause exponential acceleration.

Figure 7:
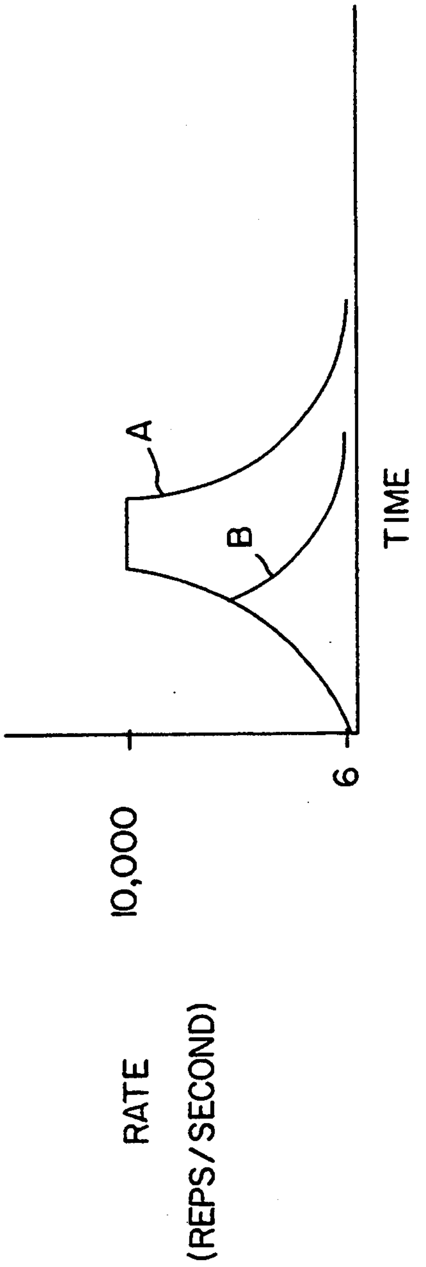
FIG. 7 is a graph representing a stepper motor rate during movement of the hands of an analog timepiece according to the present invention.

In the preferred embodiment, to advance the hands by one hour, the microcontroller 5 performs 5,000 steps of an exponential ramp for 6 seconds to ramp up to the maximum rate of 10,000 steps per second, which is maintained for slightly longer than one second. It then performs another 5,000 steps to ramp down to normal 6 Hz frequency. This protocol is used to avoid sudden, large changes in the hand speed, which would strain the internal mechanisms and cause the motor to lose steps or stall, while using a high maximum speed. To reverse by one hour, the same protocol is used, except the direction output line 40 is switched to a low logic state, causing the stepper motor to increment the hands backwards. When the reverse motion is complete, the direction output line 40 is switched back to a high logic state to advance the hands in the forward direction. If the microcontroller 5 determines that movement of more than one hour is necessary, the maximum rate can be maintained for an extended period. If less movement is necessary, it is conceivable that the rate would not reach its maximum, and would begin its deceleration earlier. This is shown in FIG. 7, where line A represents the rate during a full hour movement and line B represents the rate during, perhaps, a quarter-hour movement, where the maximum rate is not reached nor needed.

It is contemplated that this analog control system for moving hands to match local time can be used with any known location and time zone determining system. The analog control system is responsive to information representing the local time, regardless of the device used to obtain that information. It is also contemplated that a display could be added to the analog watch to display the city name of the current location.

The normal and editing modes are exemplified in FIG. 2, which shows the system taken by a traveller going from Chicago to East Hampton via New York. In Chicago, the display mode 20 appears for a normal mode. While in an airplane to New York, display mode 21 appears which displays the words "IN TRANSIT" to signify that the system is unable to pick up broadcast radio frequencies. After arrival in New York, the system picks up radio frequencies and shows display mode 22. Assuming that the system does not have a signature list of broadcast radio frequencies of East Hampton, the words "NEW LOCATION" flash when the system is in East Hampton and automatically enters into the editing mode. This is shown in display mode 23. The user then enters location information by pressing the pushbuttons 6, the result being that shown in display mode 24.

Figure 3:
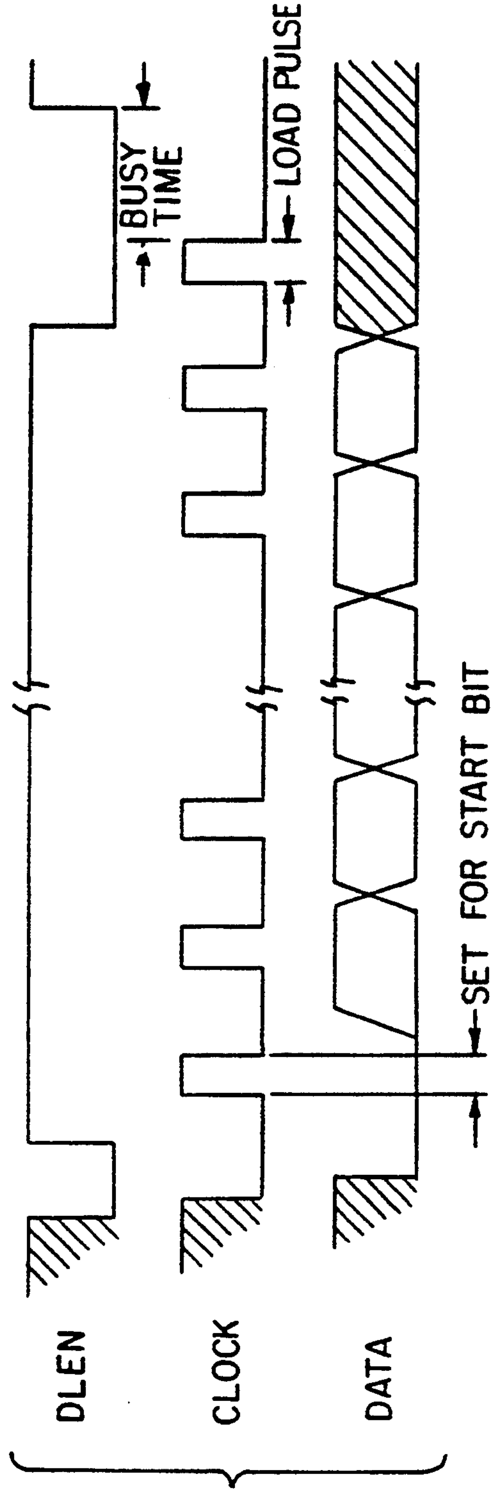
FIG. 3 is a bus timing diagram which serves as an interface between the radio frequency synthesizer and the microcontroller of FIG. 1

After the editing procedure is complete, the microcontroller 5 enables the frequency synthesizer 3 to commence operation by transmitting a logic high state (i.e., a logical 1) to the DLEN latch register of the frequency synthesizer 3 so as to thereby enable the other registers to receive data. Data bit information and clock information may then be transmitted to the DATA and CLCK latch registers. The timing requirements for the transference of information via data and clock registers is shown in FIG. 3.

Figure 5:
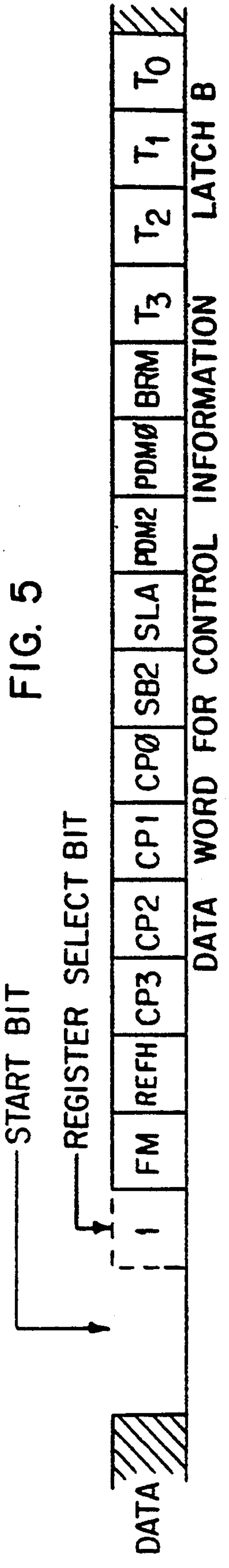
FIG. 5 is a schematic diagram of a data word for control information with respect to data latch register B of the bus of FIG. 3.

The microcontroller 5 first sets up latch B by designating the destination of data to latch B by means of setting the first bit as shown in FIG. 5. The register select bit is brought to a logic high state (e.g., logical 1). Once this data is loaded into latch B via the DATA register, the microcontroller 4 understands what mode of operation (e.g., FM, AM, TV) to be in. This bit position definition for latch B controls modulation detection (AM or FM) and the frequency step increment.

Figure 4:
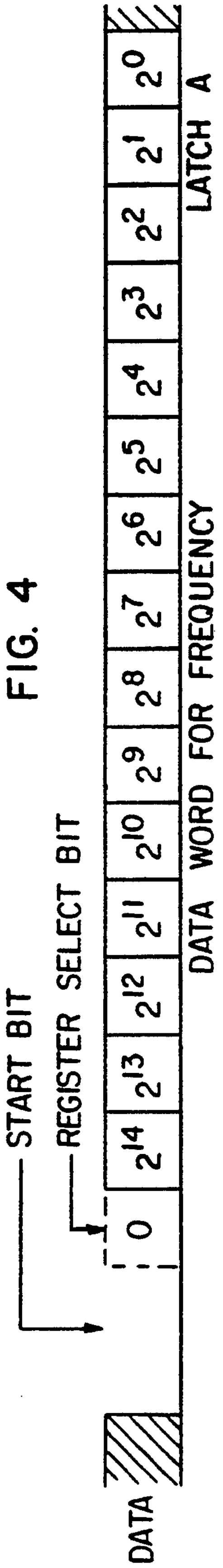
FIG. 4 is a schematic diagram of a data word for frequency with respect to data latch register A of the bus of FIG. 3.

Next, the microcontroller 5 loads data into latch A of FIG. 4 via the DATA latch register and sets the first bit to a low state (e.g., logical 0). Once the data is loaded into the register, the frequency synthesizer 3 uses this 15 bit binary number which is multiplied by the step frequency in order to produce the target radiowave frequency. Timing of data transfer is done with respect to the clock control information received at the CLCK latch register pursuant to FIG. 3.

The microcontroller 5 then reloads latch B to select the FM mode of operation, assuming the AM mode was first selected. The microcontroller 5 repeats the process of reloading the A register for incrementally checking for the presence of broadcast radiowave frequencies which match target radiowave frequencies.

After this iterative search process is completed, namely that the search through the entire frequency ranges in the AM and FM bands is complete, a list of target radiowave frequencies which match the broadcast radiowave frequencies will have been stored in RAM. This list is compared to the table of radiowave frequencies stored in ROM in order to determine the location indexed by the table which is common to all the target radiowave frequencies listed in RAM, as well as to retrieve the offset hour for that city that is found in another table stored in ROM.

The best match is the one in which the greatest number of frequencies which make up a signature list in ROM were received as broadcast. Any ties are decided by choosing the matched list that had the greatest signal strengths for its broadcast frequencies.

The iterative search process is also preferably conducted for target broadcast TV frequencies to identify a signature list of TV frequencies stored in RAM that is associated with particular locations.

As another technique, the microcontroller 5 may compare relative signal strengths of each audio signal received with the weakest stored in memory and thereby store only 10 to 20 of the strongest at any one time.

Further, instead of displaying the time, calendar date and city on the watch face, each of the time, calendar date and city may by enunciated by a synthesized voice or recording using well known techniques. For instance, instead of the display controller 7, a voice synthesizer controller would be used. Each of the time, calendar date and city need not necessarily be displayed or enunciated at all; instead, an indication may be made of any of these parameters to any type of external device such as another controller which requires local time or location information.

For instance, the invention may display only prestored information triggered by the identification of a radio frequency signature list upon arrival of the traveller to a corresponding location. Thus, reminder information, local phone numbers and addresses, travel tips, etc. may be displayed. Graphics information, such as in the form of a local map, may also be prestored in correspondence to each location in ROM and displayed as desired on the LCD display 7, which would be a dot matrix type.

FIG. 2 shows the change in display as a traveller takes it from Chicago to New York via airplane and then to East Hampton, whose signature list is not stored in memory. This display 18 may be a clock face that is part of a watch, or any other type of portable or fixed clock. The invention may be part of a clock radio in a vehicle such as one attached to the dash of a car.

As shown in FIG. 2, the radio frequency signature list may be updated by a traveller to add locations for a set of radiowave frequencies which cannot be recognized by the microcontroller 5. When a group of radiowave frequencies are picked up which cannot be found in the signature list stored in ROM, a user enters the city and time by pressing pushbuttons. In this case, the alphabet is displayed one letter at a time and stopped by pressing a set pushbutton 6 when the correct letter appears to identify the city. This continues for four or five characters. Digits are displayed one at a time for setting the correct hour and selected in a similar manner. The microcontroller 5 then enters this information in an EEPROM memory. Thereafter, the search through the signature list includes that in ROM and EEPROM. The ability to make corrections can be handled similarly. The microprocessor's search for a match to identify the correct city should give precedence to the sets of frequencies in the EEPROM over those in ROM in the event of an inconsistency.

If radiowave frequencies are being blocked for some reason or unrecognizable (e.g., due to travel in a tunnel or on an airplane), then the time shown may be flagged "in transit" (see display mode 22 of FIG. 2) to indicate to the traveller that the time/location displayed may not reflect the proper time zone due to obstruction of receipt of radiowave frequencies.

It should be understood that the entire system may be housed in any type of timepiece such as a wrist watch or incorporated into a movable vehicle, such as an automobile, ship, plane, etc. For instance, the system may be installed in the dash of an automobile to display the time electronically with respect to the correct offset hour and to display the location where the system is located. Such a display may be in the form of a liquid crystal display or light emitting diode display.

Another variation for determining the local city would involve storing characters in RAM that are indicative of the cities from ROM that are associated with the matched target frequencies, rather than storing the matched target radiowave frequencies in ROM. The microcontroller 5 can then effect a comparison between the listed cities to determine which city is common for all matched target radiowave frequencies.

A further refinement of the present invention involves checking for accuracy of the local time to be displayed by the timekeeping system. This accuracy is effected by comparing the time on the timekeeping system with a beep tone transmitted by radio stations each hour on the hour. The beep tone has a distinct frequency level which is detectable by the microcontroller 5 which may cause the receiver 2 to tune to a predetermined frequency for that location about two minutes before the hour and holds the frequency there until a beep tone is detected in the received audio signal.

Since the beep tone has a known frequency and is preceded for two seconds by other beep tones of a lower frequency, all these tones may be searched for better accuracy. Once the hour beep tone is recognized, the clock is calibrated automatically and the normal scan mode of operation is resumed. Manual calibration is thus unnecessary. The predetermined frequency in this case is one which is known to transmit beep tones (e.g., news stations) and was detected as being picked up.

If desired, the frequency synthesizer 3, voltage controlled oscillator 4 and receiver 2 of FIG. 1 may constitute a phase locked loop in which one or two voltage lines would be added between the receiver 2 and the frequency synthesizer 3 for transmitting a mixed signal to the synthesizer 3. The loop is locked when the phase of the broadcast radio frequency is out of phase from the synthesized target radiowave frequency. A locked condition signifies a match, i.e., that the target radiowave frequency has been identified.

The microcontroller 5 therefore transmits a target radiowave frequency to the radio frequency synthesizer 3 that is to be 90 degrees or out of phase from the broadcast radio frequency to be located. Instead of or in addition to receiving a signal from the receiver 2 that is indicative of the signal strength of the tuned broadcast radio frequency, the microcontroller 5 may receive a signal indicative of a locked state of the phase lock loop since the microcontroller already knows what target radiowave frequency was to be checked. When a locked state is detected, the microcontroller stores the target radiowave frequency in its RAM memory as part of its list of matched radiowave frequencies.

The present invention is particularly useful for portable timepieces, i.e., those which will be moved between different locations or fixed to a vehicle, but also has applications to stationary timepieces since it will be self-calibrating, i.e., with respect to beep tones which are transmitted from radio stations on the hour.

While the foregoing description and drawings represent the preferred embodiments of the present invention, it will be understood that various changes and modifications may be made without departing from the spirit and scope of the present invention.

What is claimed is:

1. A portable timekeeping system comprising:

means for determining the local time corresponding to the location of the system, said determining means producing an output signal;

analog hands for indicating time;

drive means for driving said hands;

means for controlling said drive means to drive said hands at an accelerated rate until said hands indicate said local time, said controlling means being responsive to said signal; and means for determining the location of the system, said means for determining the location comprising:

receiving means for receiving broadcast radiowave frequencies;

storing means for storing information indicative of sets of radiowave frequencies which are transmitted from predetermined locations so that each set corresponds to a respective one of said predetermined locations;

matching means for matching said received broadcast radiowave frequencies from said receiving means with a matching one of said sets of radiowave frequencies; and timekeeping means for updating time indicative of a local time where said received broadcast radiowave frequencies were transmitted based on matching from said matching means.

2. A system as in claim 1, wherein said storing means also stores information indicative of an offset hour from Greenwich Mean Time for each of said predetermined locations and in correspondence with each of said sets of radiowave frequencies.

3. A system as in claim 1, wherein said storing means further stores additional information inputted by a user and in correspondence to said sets of radiowave frequencies.

4. A system as in claim 1, wherein said storing means further stores additional information indicative of localities and in correspondence to said sets of radiowave frequencies.

5. A system as in claim 1, wherein said matching means includes means for providing a plurality of target frequencies and for detecting matches between said broadcast radiowave frequencies which are received by said receiving means and said target frequencies.

6. A system as in claim 1, further comprising means for indicating said predetermined locations.

7. A system as in claim 1, wherein said matching means includes means for generating target frequencies in digital form, means for converting said digital form into analog form, oscillator means for receiving said analog form and for generating a frequency output voltage in response to receipt of said analog form, means for transmitting a signal strength of a particular frequency received from said receiving means in response to said frequency output voltage, means for detecting a presence of a particular broadcast radiowave frequency based on said signal strength.

8. A system as in claim 1, further comprising:

means for calibrating the time of said timekeeping means each hour on the hour, said calibrating means including means for detecting a beep tone which is generated on predetermined radiowave frequencies each hour on the hour and means for resetting said updating means based on detection of said beep tone.

9. A method for time keeping, comprising the steps of:

receiving broadcast radiowave frequencies from a plurality of locations;

storing information indicative of sets of received radiowave frequencies that are transmitted from said locations so that each set corresponds to a respective one of said locations;

receiving broadcast radiowave frequencies from a particular location;

matching said received broadcast radiowave frequencies from said particular location with a matching one of said sets of radiowave frequencies;

updating time indicative of a local time where said received broadcast radiowave frequencies from said particular location were transmitted based on the step of matching; and driving hands of an analog timepiece at an accelerated rate until said hands indicate the local time.

10. A portable timekeeping system, comprising:

receiving means for receiving broadcast radiowave frequencies;

storing means for storing information indicative of sets of radiowave frequencies which are transmitted from a plurality of particular locations so that each set corresponds to a respective one of said particular locations, said storing means being initially empty, said receiving means being activated at each of said particular locations and said storing means storing information indicative of the sets of received broadcast radiowave frequencies;

matching means for matching said received broadcast radiowave frequencies from said receiving means with a matching one of said sets of radiowave frequencies; and timekeeping means for updating time indicative of a local time where said received broadcast radiowave frequencies were transmitted based on matching from said matching means.

11. A timekeeping system as in claim 10, wherein said timekeeping means comprises:

analog hands for indicating time;

drive means for driving said hands; and means for controlling said drive means to drive said hands at an accelerated rate until said hands indicate said local time.

* * * * *